April 15, 1941.  P. THOMAS  2,238,610

WIRE ENAMELING

Filed March 31, 1939

INVENTOR
Phillips Thomas.
BY
Paul E. Friedemann
ATTORNEY

Patented Apr. 15, 1941

2,238,610

UNITED STATES PATENT OFFICE 2,238,610

WIRE ENAMELING

Phillips Thomas, Edgewood, Pa., assignor to Westinghouse Electric & Manufacturing Company, East Pittsburgh, Pa., a corporation of Pennsylvania Application March 31, 1939, Serial No. 265,184

9 Claims. (Cl. 175—183)

My invention relates to wire enameling, more specifically to a method of determining the condition of the enamel on an enameled wire, that is to say, its thickness and the degree of curing the enamel has undergone during the curing process.

Heretofore, the method of determining the condition of the enamel of a finished enameled wire embraced the measurement of the enamel thickness by a micrometer or the like and a determination of the degree of curing the enamel has had by mere observation of color of the enameled wire. These determinations are too slow and inaccurate.

An object of my invention is to provide a method for determining the condition and finish of the enamel of an enameled wire which comprises electrical metering means for measuring the thickness of the enamel and the degree of curing of the enamel of a finished enameled wire.

Other objects and advantages will become more apparent from a study of the following specification when considered in conjunction with the accompanying drawing, in which.

Figure 1:
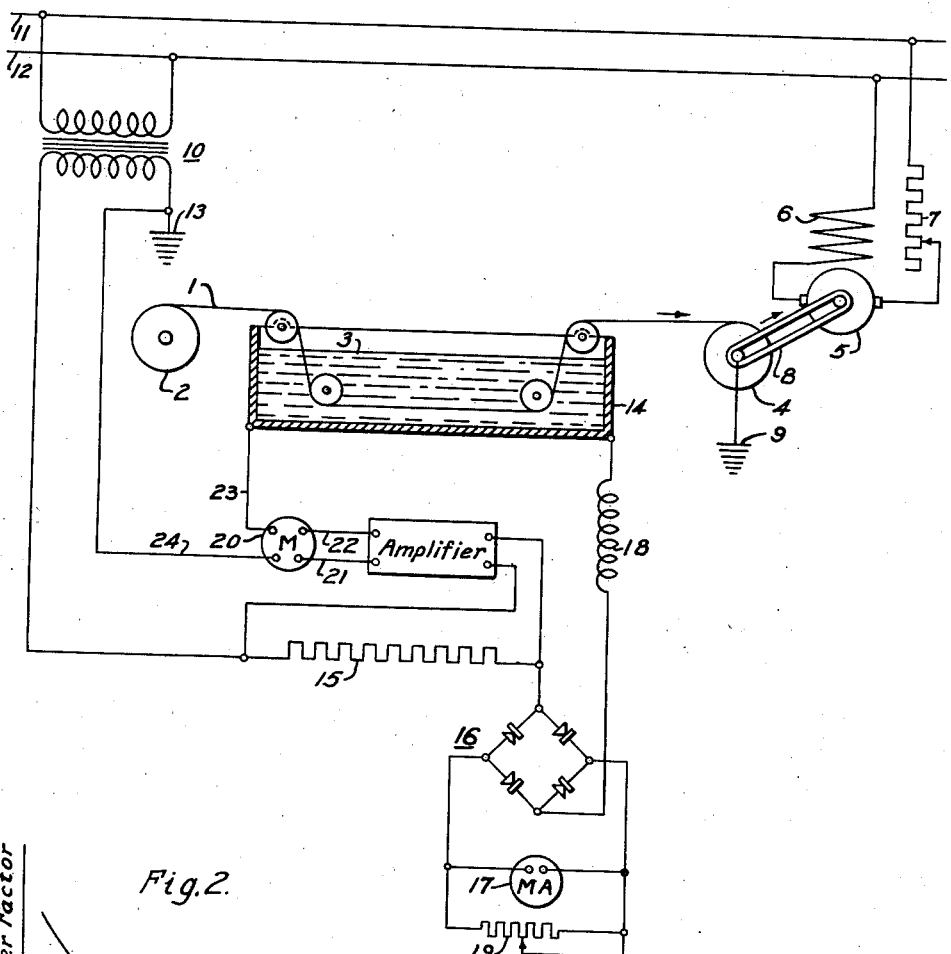
Figure 1 is a schematic showing of an apparatus involving my invention.

Referring to Figure 1, numeral 1 denotes a finished enameled wire, that is, one which has already been cured and which is passed from roll 2 through an electrically conductive liquid bath 3 to a spool 4 on which it is wound. Spool 4 is driven by an electric motor 5 having a field coil 6 and a variable resistor 7, which variable resistor provides speed control for the motor. The drive is through a belt 8 which moves in the direction of the arrow. One end of the wire on spool 4 is metallically connected to the spool and to a ground connection 9.

A transformer 10 is fed from a source of alternating current power represented by buses 11 and 12. One terminal of the secondary of transformer 10 is grounded by ground connection 13 which is common with ground connection 9, therefore, this terminal of the secondary winding is, in effect, connected to the end of the wire or spool 4. The other terminal of the secondary is connected to tank 14 through resistor 15, a copper oxide rectifier 16, direct current milliammeter 17 and inductance coil 18. It will thus be seen that the wire and the liquid bath 3 are, in effect, two plates of an electrical condenser in which the enamel coating on the wire forms the dielectric thereof.

Across these condenser plates, the voltage of the secondary of transformer 10 is applied. Inasmuch as the electrical capacity of an enameled coating for a given kind of enameling varnish is inversely proportional to the thickness of the coating, it will be obvious that a measurement of the capacity of the above described condenser will give a reading which is inversely proportional to the thickness of the coating. The direct current milliammeter 17 reads the current passing through the enamel coating. Such current, of course, is directly proportional to the capacity of the wire enamel and bath.

Milliammeter 17 may be calibrated to directly indicate the thickness of the coating of enamel. A variable resistor 19 is provided in shunt with the milliammeter in order to change the sensitivity thereof for different conditions, for example, for different enamel varnishes. Inductance coil 18 increases the sensitivity of the milliammeter 17 and prevents damage to the meter due to wire defects, such as pin holes in the enamel. The alternating current voltage of the secondary of the transformer 10 is preferably of high frequency in the order of about 26,000 cycles.

Figure 2:
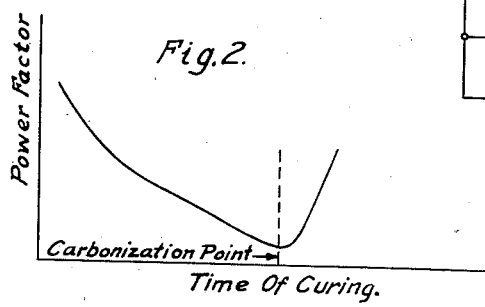
Fig. 2 is a graph showing the relationship between power factor and time of curing during the curing process of an enameled wire.

In order to electrically determine the degree of curing the finished enameled wire 1 has undergone during the curing process, advantage is taken of the fact that the phase angle between the voltage and current through the condenser, that is, through the bath, enamel and wire varies in accordance with the time of curing of the enamel. Fig. 2 shows this relation.

Instead of the phase angle, however, Fig. 2 represents the power factor that is the cosine of this angle as one of the coordinates, the other coordinate being time of curing. As will be observed from an inspection of Fig. 2, when the enamel is still hot and soft and is at the beginning of the curing process, it is quite conductive electrically and the power factor is relatively high. As the time of curing progresses, the change in power factor decreases in direct proportion to time as the enamel solidifies and becomes more insulative until the point is reached in which the enamel begins to carbonize due to overcuring and after which time the enamel again begins to become conductive, hence the power factor will thereafter increase rapidly.

Meter 20 measures the phase angle between the voltage and the current through the condenser. Since the IR drop through resistor 15 is in phase with the current through the enamel, it will be observed that the current therethrough varies directly as the in-phase current through the meter and it is supplied to an amplifier, then through conductors 21 and 22 to the current coil of meter 20. The voltage coil of meter 20 has impressed on it the voltage of the secondary of transformer 10 which is applied across conductors 23 and 24. Meter 20 may be a phase angle meter or may be a watt meter or power factor meter suitably calibrated. The correct readings of meters 20 and 17 when the desired quality of finished wire is being made, are determined from experience and the permissible upper and lower limits may be marked on the meter dials.

These meters may be recording meters, if desirable, so as to provide a continuous record of the wire condition, that is, its quality and thickness. Fprthermore, it will be obvious to those skilled in the electrical art that contacts may be provided at the upper and lower limits of these meters so as to automatically close a circuit which is effective to make proper adjustments in the process to correct any departure from the desired quality of the enamel. In other words, the amount of solvent which is fed into the varnish may be automatically controlled by such contacts on the meters. It is obvious also that insulative coatings other than enamel may likewise be analyzed with respect to quality and thickness.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. The method of determining the condition of an insulating coating on a continuously moving wire which comprises passing the insulated wire through an electrically conductive liquid bath, applying an alternating voltage between the wire and liquid bath which, in effect, form two plates of an electrical condenser wherein the insulating coating forms the dielectric, measuring the capacity of said condenser by measuring the current through said insulation coating, to determine the thickness of the insulation coating, furthermore to simultaneously measure the phase difference between said voltage and current to determine the degree of curing of said insulating coating, and from these two readings determining the condition of said insulating coating.

2. An apparatus for determining the condition of an insulating coating on a wire adapted for continuous movement which comprises, in combination, an electrically conductive liquid bath, an insulated wire which is contained within said liquid bath, electrical means including an electrical dynamometer type of meter for visually determining the thickness of insulating material on said wire, and electrical means for simultaneously determining the degree of curing of said insulating material.

3. An apparatus for determining the condition of an insulating coating on a continuously moving wire which comprises, in combination, an electrically conductive liquid bath, an insulated wire which is contained within said liquid bath, electrical means including an electrical dynamometer type of meter directly responsive to changes in capacity of the insulating material on said wire for visually determining the thickness of said insulating material and electrical metering means which is directly responsive to changes in resistance of said insulating coating for simultaneously determining the degree of curing of said insulating material.

4. An apparatus for determining the condition of an enamel coating on a wire adapted for continuous movement which comprises, in combination, an electrically conductive liquid bath, a wire having an enamel coating thereon and which is contained in said bath, thus forming, in effect, an electrical condenser having said wire and liquid bath as plates and said enamel material as the dielectric, means including an electrical dynamometer type of meter for visibly applying an alternating voltage between said wire and said liquid bath, means for measuring the capacity of said electrical condenser for determining the thickness of said enamel coating, and means for simultaneously measuring the phase angle between said voltage and the current passing through said electrical condenser for determining the degree of curing of said enamel.

5. An apparatus for determining the condition of an enamel coating on a wire adapted for continuous movement which comprises, in combination, an electrically conductive liquid bath, a wire having an enamel coating thereon and which is contained in said bath, thus forming, in effect, an electrical condenser having said wire and liquid bath as plates and said enamel material as the dielectric, means including an electrical dynamometer type of meter for visibly applying an alternating voltage between said wire and said liquid bath, means for measuring the capacity of said electrical condenser for determining the thickness of said enamel coating, and means for simultaneously measuring the phase angle between said voltage and the current passing through said electrical condenser for determining the conductivity and degree of curing of said enamel, said last named means comprising a power factor meter.

6. An apparatus for determining the condition of an enamel coating on a continuously moving wire which comprises, in combination, an electrically conductive liquid bath, a wire having an enamel coating thereon and which is contained in said bath, thus forming, in effect, an electrical condenser having said wire and liquid bath as plates and said enamel material as the dielectric, means for applying an alternating voltage between said wire and said liquid bath, means for measuring the capacity of said electrical condenser for determining the thickness of said enamel coating, which includes a rectifier and a direct current milliammeter in series relationship with respect to said voltage, and means for simultaneously measuring the phase angle between said voltage and the current passing through said electrical condenser for determining the conductivity and degree of curing of said enamel.

7. An apparatus for determining the condition of an enamel coating on a continuously moving wire which comprises, in combination, an electrically conductive liquid bath, a wire having an enamel coating thereon and which is contained in said bath, thus forming, in effect, an electrical condenser having said wire and liquid bath as plates and said enamel material as the dielectric, means for applying an alternating voltage between said wire and said liquid bath, means for measuring the capacity of said electrical condenser for determining the thickness of said enamel coating, which includes a rectifier, a direct current milliammeter, a resistance, and an inductance coil in series relationship with respect to said voltage, and means for simultaneously measuring the phase angle betwen said voltage and the current passing through said electrical condenser for determining the conductivity and degree of curing of said enamel.

8. The method of determining the thickness of an insulating coating on a continuously moving wire which comprises passing the insulated wire through an electrically conductive liquid bath, applying an alternating voltage between the wire and liquid bath which, in effect, form two plates of an electrical condenser wherein the insulating coating forms the dielectric, measuring the absolute value of the capacity of said insulating coating to determine the thickness thereof.

9. An apparatus for determining the thickness of an enamel coating on a wire adapted for continuous movement which comprises, in combination, an electrically conductive liquid bath, a wire having an enamel coating thereon and which is contained in said bath, thus forming, in effect, an electrical condenser having said wire and liquid bath as plates and said enamel material as the dielectric, means for applying an alternating voltage between said wire and said liquid bath, means for measuring the absolute value of the capacity of said electrical condenser for determining the thickness of said enamel coating.

PHILLIPS THOMAS.